United States Patent
Lee et al.

(10) Patent No.: US 7,257,416 B2
(45) Date of Patent: Aug. 14, 2007

(54) MOBILE LOCATION BASED SERVICE SYSTEM AND METHOD

(75) Inventors: Sang Yun Lee, Gyeonggi-do (KR); Hee Hyeok Hahm, Seoul (KR); Ki Mun Kim, Incheon (KR); Yeong Tae No, Seoul (KR); Jae Young Ju, Gyeonggi-do (KR)

(73) Assignee: S K Telecom (KR)

( * ) Notice: Subject to any disclaimer, the term of this patent is extended or adjusted under 35 U.S.C. 154(b) by 511 days.

(21) Appl. No.: 10/455,981

(22) Filed: Jun. 5, 2003

(65) Prior Publication Data

US 2004/0043773 A1   Mar. 4, 2004

(30) Foreign Application Priority Data

Jul. 25, 2002   (KR)   ...................... 10-2002-0043922
Jul. 25, 2002   (KR)   ...................... 10-2002-0043923

(51) Int. Cl.
*H04Q 7/20*   (2006.01)
(52) U.S. Cl. .................. 455/456.2; 455/456.1; 455/456.3; 455/433; 455/457
(58) Field of Classification Search ............ 455/456.1, 455/456.2, 456.3
See application file for complete search history.

(56) References Cited

U.S. PATENT DOCUMENTS

| | | | |
|---|---|---|---|
| 6,144,849 A * | 11/2000 | Nodoushani et al. ....... 455/419 |
| 6,151,498 A * | 11/2000 | Roel-Ng et al. ............ 455/433 |
| 6,611,688 B1 * | 8/2003 | Raith .......................... 340/992 |
| 6,716,101 B1 * | 4/2004 | Meadows et al. ......... 455/456.1 |
| 6,757,545 B2 * | 6/2004 | Nowak et al. ............ 455/456.2 |
| 6,807,168 B2 * | 10/2004 | Daly et al. ................... 370/352 |
| 6,917,813 B2 * | 7/2005 | Elizondo .................... 455/466 |
| 2002/0072376 A1 * | 6/2002 | Carlsson et al. ............ 455/456 |
| 2002/0187781 A1 * | 12/2002 | Furlong ...................... 455/433 |
| 2003/0060197 A1 * | 3/2003 | Benes et al. ................ 455/433 |
| 2005/0239476 A1 * | 10/2005 | Betrabet et al. ......... 455/456.1 |

FOREIGN PATENT DOCUMENTS

| | | |
|---|---|---|
| JP | 2000-102058 | 4/2000 |
| KR | 2000-0037429 | 7/2000 |
| KR | 10-2003-0043439 | 6/2003 |

\* cited by examiner

*Primary Examiner*—Duc M. Nguyen
*Assistant Examiner*—Mazda Sabouri
(74) *Attorney, Agent, or Firm*—Lahive & Cockfield, LLP

(57) ABSTRACT

The present invention discloses a mobile location based service system and method. The mobile location based service system includes an application server for receiving a location based service request, and providing a location based service of a mobile station, and a location information providing system for discriminating location of the mobile station according to a kind of a location information service, and transmitting the location of the mobile station to the application server. A cell or GPS based location based service can be selectively provided according to a function of a mobile station of a mobile communication subscriber and a service request type. The GPS based location based service can be provided by an SMS delivery point to point message through an N07 signal network, and thus embodied during a voice call of the mobile station.

3 Claims, 8 Drawing Sheets

MOBILE LOCATION BASED SERVICE SYSTEM AND METHOD

BACKGROUND OF THE INVENTION

1. Field of the Invention

The present invention relates to a location based service of a mobile station, and more particularly to a mobile location based service system which can provide a location based service of a mobile station by selectively using a cell based location service or global positioning system (GPS) based location service according to a kind of a location based service request.

2. Description of the Background Art

Recently, various kinds of services are provided by a mobile station according to the development of mobile station (for example, cellular phone) technology. That is, the mobile station provides a short message service and a wireless internet service as well as a voice call service. Each service is subdivided according to contents providing types.

One of the mobile station services is a location information providing service of the mobile station. The location information providing service can be embodied as follows.

The location information providing service can be provided by using cell based technology. The cell based service is performed based on location of a base transceiver station which the mobile station exists in. Therefore, the cell based location information providing service guarantees accuracy within a radius of the base transceiver station. It is thus difficult to apply the cell based location information providing service to urgent cases or services requiring accurate location information.

In addition, the location information providing service can be provided by using GPS based technology in the mobile station. The GPS is location information providing technology using satellites, which shows much higher accuracy than the cell based location information providing service. However, the mobile station requires a GPS function to provide services using the GPS, which increases expenses. It is thus difficult to provide the location information providing service using the GPS in the whole mobile stations.

SUMMARY OF THE INVENTION

Accordingly, it is an object of the present invention to provide a mobile location based service system which can provide cell based and GPS based location based services according to a location information providing function supported by a mobile station and a service request type.

In order to achieve the above-described object of the invention, there is provided a mobile location based service system, including: an application server for receiving a location information service request, requesting location information of a corresponding mobile station, and providing the location information of the mobile station through an internet; and a location information providing system for receiving a location information request from the application server, discriminating location of the mobile station according to a kind of a location information service provided by a mobile switching center which the mobile station belongs to, by referring to the mobile switching center on the basis of an identification number of the mobile station, and transmitting the location to the application server.

According to another aspect of the invention, a mobile location based service method includes the steps of: receiving an SMDPP message from a positioning determination entity, and extracting a data message from the SMDPP message; when the SMDPP message initiates a location based service, confirming whether a traffic channel has been allocated to a corresponding mobile station; when the traffic channel has been allocated to the mobile station, transmitting the data message to the mobile station by using the traffic channel; when the traffic channel has not been allocated to the mobile station, newly allocating a traffic channel to the mobile station, and transmitting the data message to the mobile station by using the traffic channel; and responding to the positioning determination entity on the basis of a response message from the mobile station.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

A mobile location based service system and method in accordance with a preferred embodiment of the present invention will now be described in detail with reference to the accompanying drawings.

Figure 1:
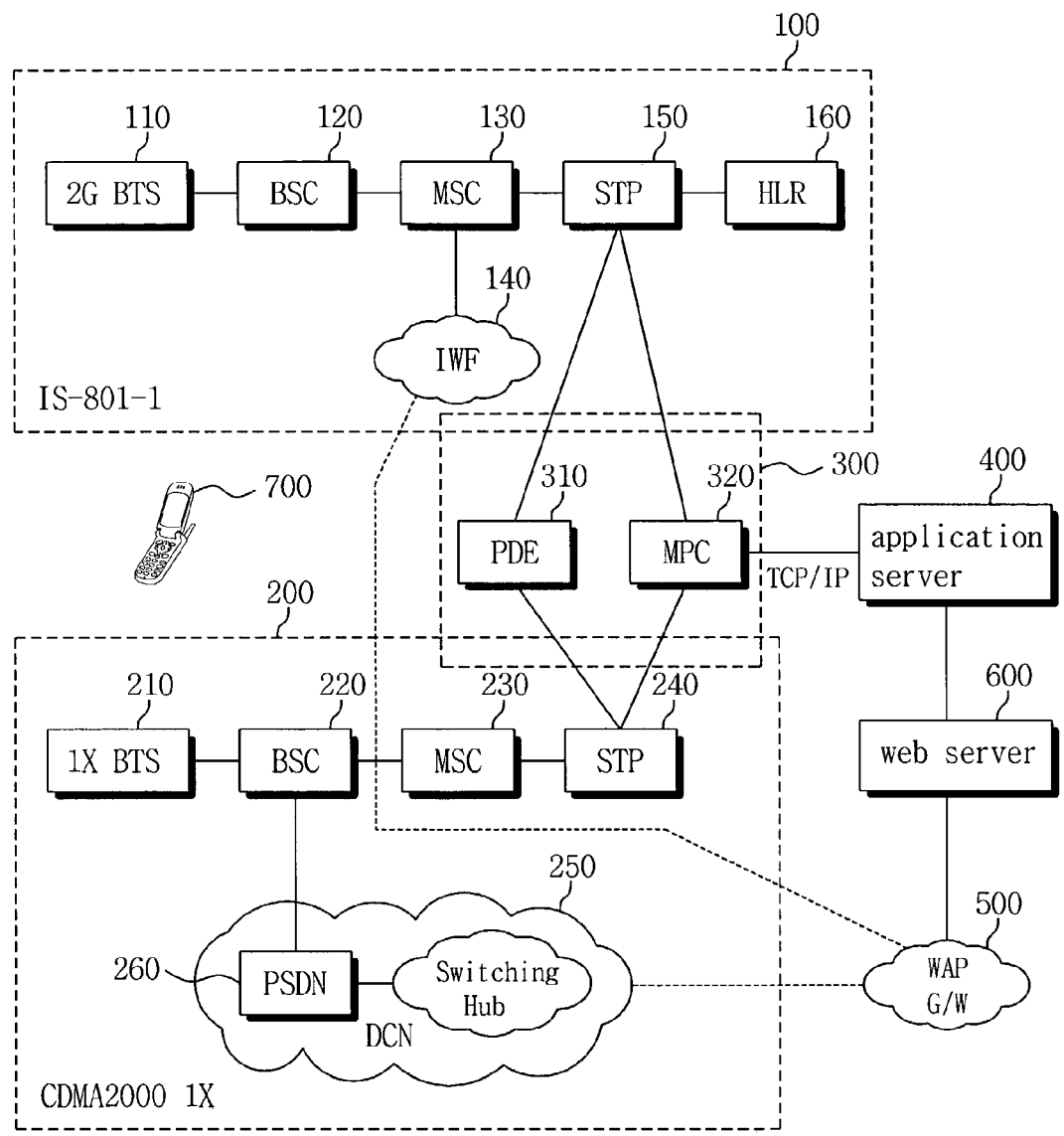
FIG. 1 is a structure diagram illustrating a mobile location based service system which can provide cell based and GPS based location based services in accordance with a preferred embodiment of the present invention.

FIG. 1 is a structure diagram illustrating the mobile location based service system which can provide cell based and GPS based location based services in accordance with the preferred embodiment of the present invention. Reference numeral 100 denotes a 2 G mobile phone network system, 200 denotes a 2.5 G mobile phone network system, 300 denotes a location information providing system, 400 denotes an application server, and 600 denotes a web server.

In the 2 G mobile phone network system 100, reference numeral 110 denotes a base transceiver station (BTS), 120 denotes a base station controller (BSC), 130 denotes a mobile switching center (MSC), 140 denotes an interworking facility (IWF), 150 denotes a signal transfer point (STP), and 160 denotes a home location register (HLR). In the location information providing system 300, reference numeral 310 denotes a positioning determination entity (PDE), and 320 denotes a mobile positioning center (MPC). In the 2.5 G mobile phone network system 200, reference numeral 210 denotes a BTS, 220 denotes a BSC, 230 denotes an MSC, and 240 denotes an STP.

Referring to FIG. 1, the 2 G mobile phone network system 100 is connected to the PDE 310 and the MPC 320 of the location information providing system 300 through the STP 150. Identically, the 2.5 G mobile phone network system 200 is connected to the PDE 310 and the MPC 320 of the location information providing system 300 through the STP 240.

The application server 400 which provides the location information service upon the request of the web server 600 is connected to the MPC 320 of the location information providing system 300 through TCP/IP.

Figure 2:
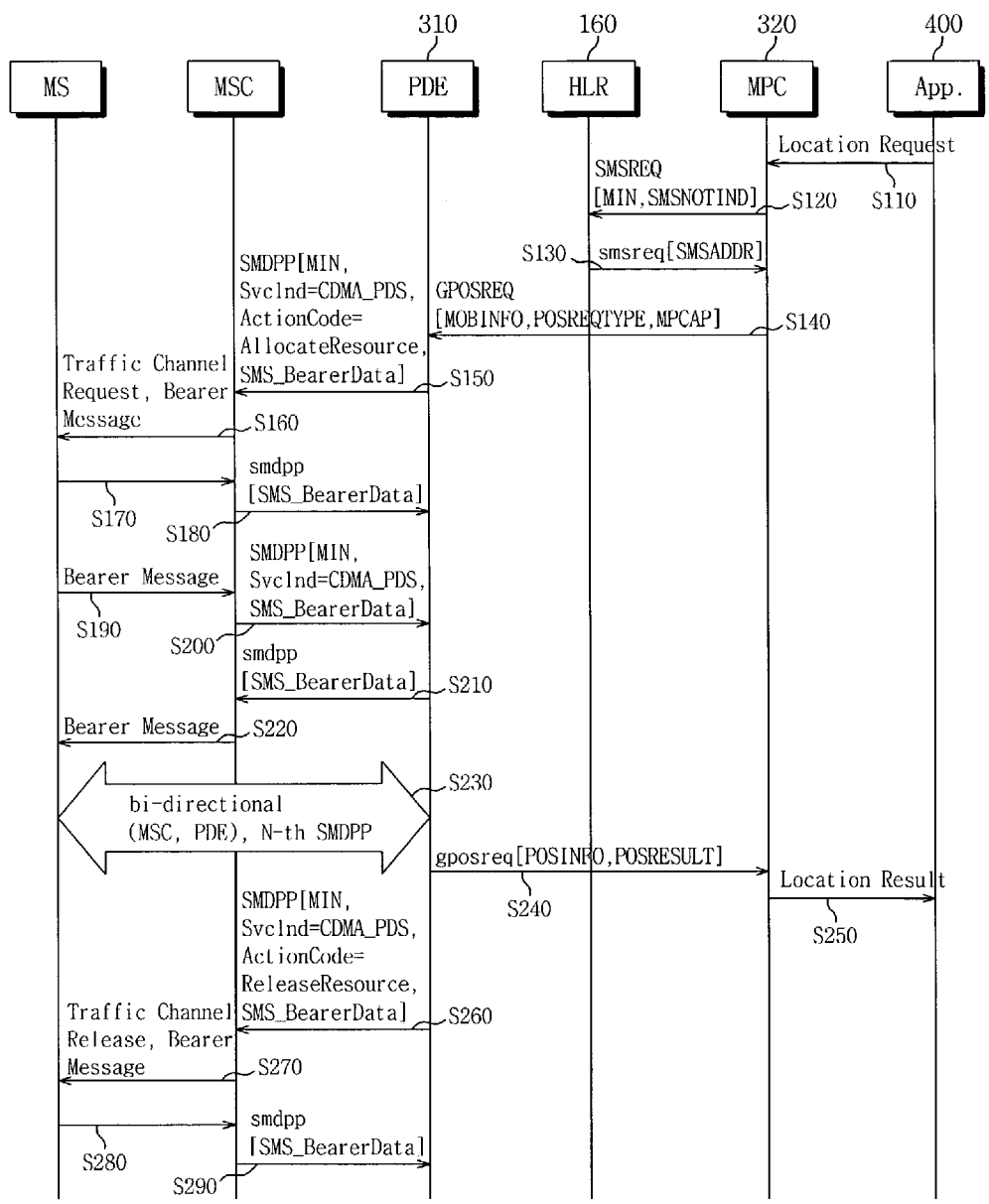
FIG. 2 illustrates a message flow of the GPS based service in the mobile location based service system in accordance with the preferred embodiment of the present invention.

FIG. 2 illustrates a message flow of the GPS based service in accordance with the preferred embodiment of the present invention. Reference numeral 400 denotes an application server, 320 denotes an MPC, 160 denotes an HLR, and 310 denotes a PDE.

The application server 400 requests a location service to the MPC 320 (S110). The MPC 320 transmits an SMSREQ message to the HLR 160 on the basis of a mobile identification number (MIN) of a corresponding mobile station (MS) (S120). Here, the MPC 320 sets SMSNOTIND of the parameters of the SMSREQ message as '2' in order to prevent SMS pending. The HLR 160 transmits a SMSREQ result message to the MPC 320 (S130). The MPC 320 confirms whether the reception MSC has a GPS based location service function by analyzing SMSADDR of the SMSREQ result message. The MPC 320 transmits a GPOSREQ message to the PDE 310 according to whether the reception MSC can support the GPS based location service (S140). Parameters transmitted with the GPOSREQ message include MOBINFO, POSREQTYPE and MPCAP.

The PDE 310 obtains location information of the corresponding MS on the basis of the IS-801-1 standards (S150~S230). The location information of the MS received in the PDE 310 is transmitted to the MPC 320 by a gposreq message. Parameters of the gposreq message include POSINFO and POSRESULT.

The MPC 320 transmits a location result Location Result to the application server 400 (S250). On the other hand, the PDE 310 transmits an SMDPP message to the MSC to release resources generated in the MSC after transmitting the message to the MPC 320 (S260 and S270).

Figure 3:
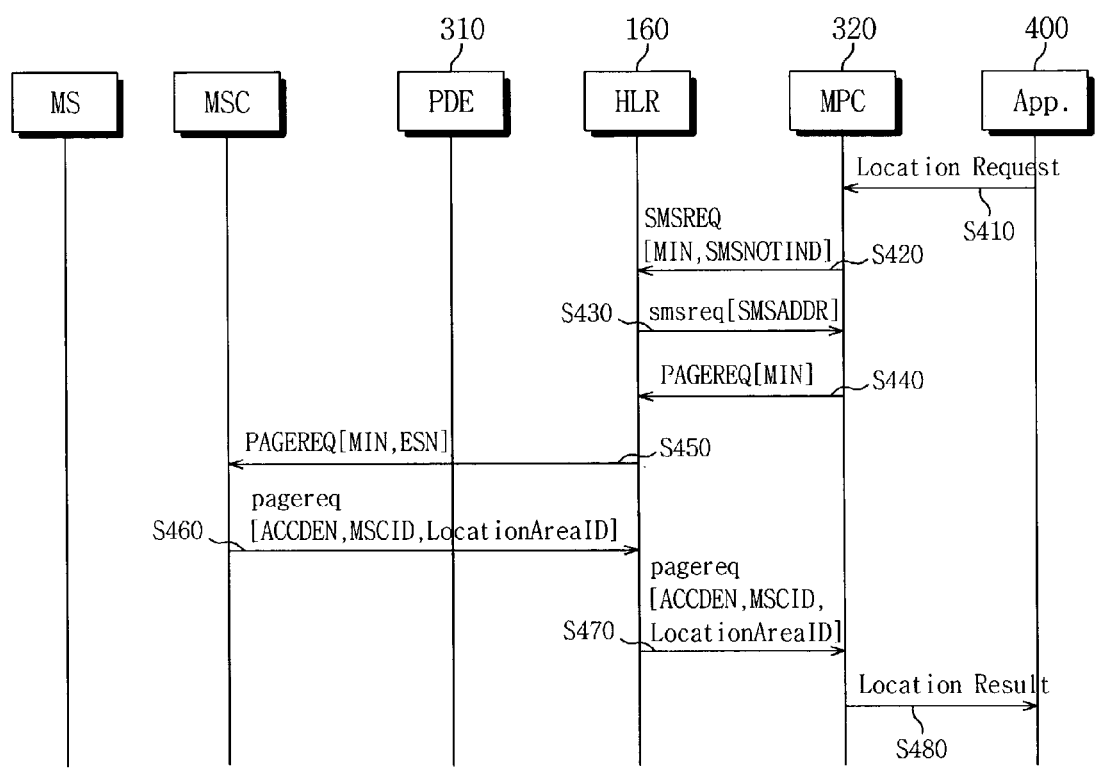
FIG. 3 illustrates one example of a message flow of the cell based service in the mobile location based service system in accordance with the preferred embodiment of the present invention.

FIG. 3 illustrates one example of a message flow of the cell based service in accordance with the preferred embodiment of the present invention. Reference numeral 400 denotes an application server, 320 denotes an MPC, 160 denotes an HLR, and 310 denotes a PDE.

The application server 400 requests a location service to the MPC 320 (S410). The MPC 320 transmits an SMSREQ message to the HLR 160 on the basis of an MIN of a corresponding MS (S420). Here, the MPC 320 sets SMSNOTIND of the parameters of the SMSREQ message as '2' in order to prevent SMS pending. The HLR 160 receiving the SMSREQ message transmits an smsreq result message to the MPC 320 (S430). The MPC 320 confirms whether a reception MSC can support the GPS based location service by analyzing the smsreq result message. The MPC 320 transmits a PAGEREQ message to the HLR 160 according to whether the reception MSC can support the GPS based location service (S440). The PAGEREQ message includes an MIN parameter of the MS.

The HLR 160 receives the PAGEREQ message, and transmits it to the MSC which the reception MS currently roams (S450). The PAGEREQ message includes MIN and ESN parameters. The MSC tracks location of the MS, and transmits a pagereq message to the HLR 160 (S460). The pagereq message includes ACCDEN, MSCID and LocationAreaID parameters. Here, when failing to track location of the MS, the MSC sets failure reasons in the ACCDEN parameter. When a value of the ACCDEN is 'busy', the MS is in a busy state. Accordingly, the location of the MS can be normally tracked.

The HLR 160 transmits the pagereq message from the MSC to the MPC 320 (S470). The pagereq message includes ACCDEN, MSCID and LocationAreaID parameters. The MPC 320 responds to the application server 400 in regard to the location service on the basis of the pagereq message (S480).

Figure 4:
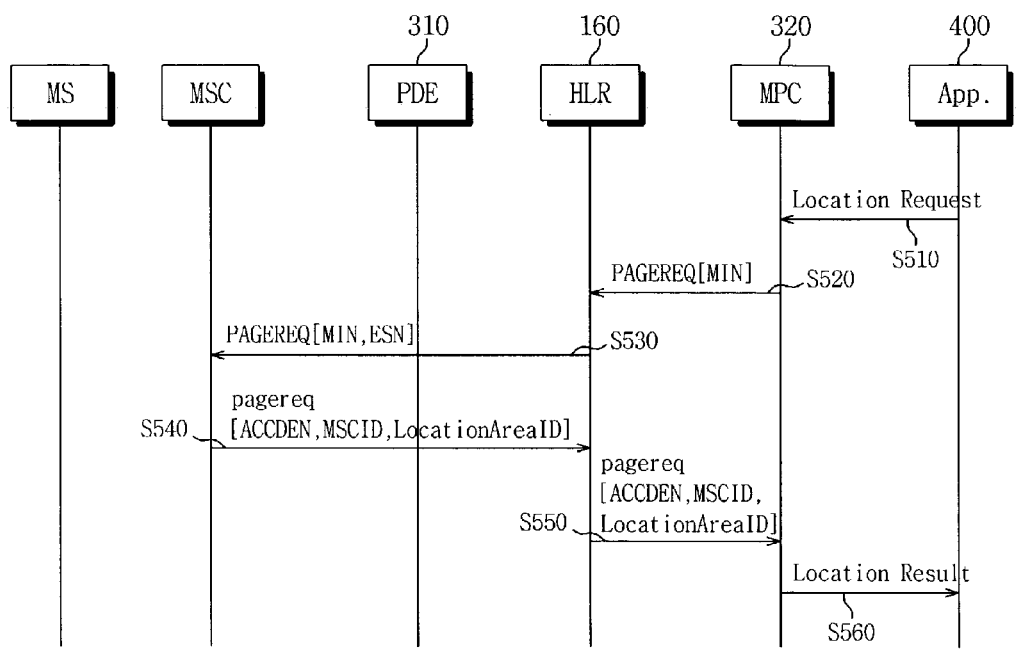
FIG. 4 illustrates another example of the message flow of the cell based service in the mobile location based service system in accordance with the preferred embodiment of the present invention.

FIG. 4 illustrates another example of the message flow of the cell based service in accordance with the preferred embodiment of the present invention. Reference numeral 400 denotes an application server, 320 denotes an MPC, 160 denotes an HLR, and 310 denotes a PDE.

The application server 400 requests a location service to the MPC 320 (S510). The MPC 320 receiving the location service request transmits a PAGEREQ message to the HLR 160 (S520). Here, the PAGEREQ message includes an MIN parameter.

The HLR 160 refers to an MSC which a reception MS currently roams on the basis of the PAGEREQ message, and transmits the PAGEREQ message to the MSC (S530). The PAGEREQ message transmitted to the MSC includes MIN and ESN parameters.

The MSC tracks location of the MS, and transmits a pagereq message to the HLR 160 (S540). The pagereq message includes ACCDEN, MSCID and LocationAreaID parameters.

When failing to track location of the MS, the MSC sets failure reasons in the ACCDEN parameter. On the other hand, when a value of the ACCDEN is 'busy', the MS is in a busy state. Accordingly, the location of the MS can be normally tracked.

The HLR 160 transmits the pagereq message from the MSC to the MPC 320 (S550). The pagereq message includes ACCDEN, MSCID and LocationAreaID parameters. The MPC 320 responds to the application server 400 in regard to the location service on the basis of the pagereq message (S560).

The location based service of the present invention does not influence charging of the MSC, and the messages relating to the location based service are always transmitted by using a traffic channel by wireless.

The operation of the location based service in the MSC in various states of a subscriber service in accordance with the present invention will now be explained in detail.

Figure 5A:
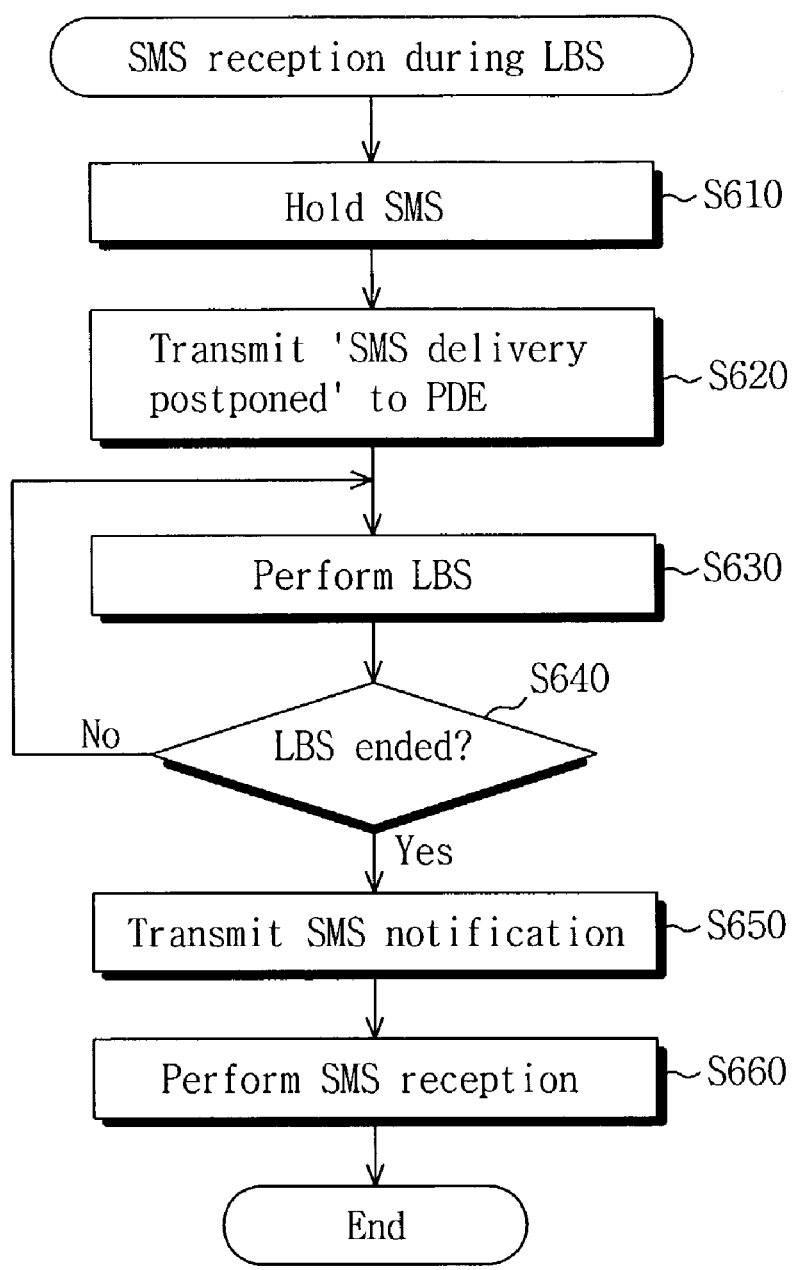
FIG. 5a is a flowchart showing a procedure of processing an SMS in a mobile switching center during the location based service.

FIG. 5a is a flowchart showing a procedure of processing an SMS in the MSC during the location based service.

When the MSC receives the SMS during the location based service, the MSC holds the SMS through a visitor location register (VLR) (S610), and transmits an SMDPP result message to a short message service center (SMC) (S620). For example, SMS_CauseCode of the result message transmitted to the SMC has a value of 0×24 (SMS delivery postponed). Here, the MSC normally performs the location based service (S630). When ending the location based service (S630), the MSC transmits an SMS notification message to the SMC (S650), and receives the SMS (S660). Accordingly, when the location based service has been ended, the SMS notification message is transmitted in the same manner as when the message is transmitted by the MSC by using an SMS standby flag.

Figure 5B:
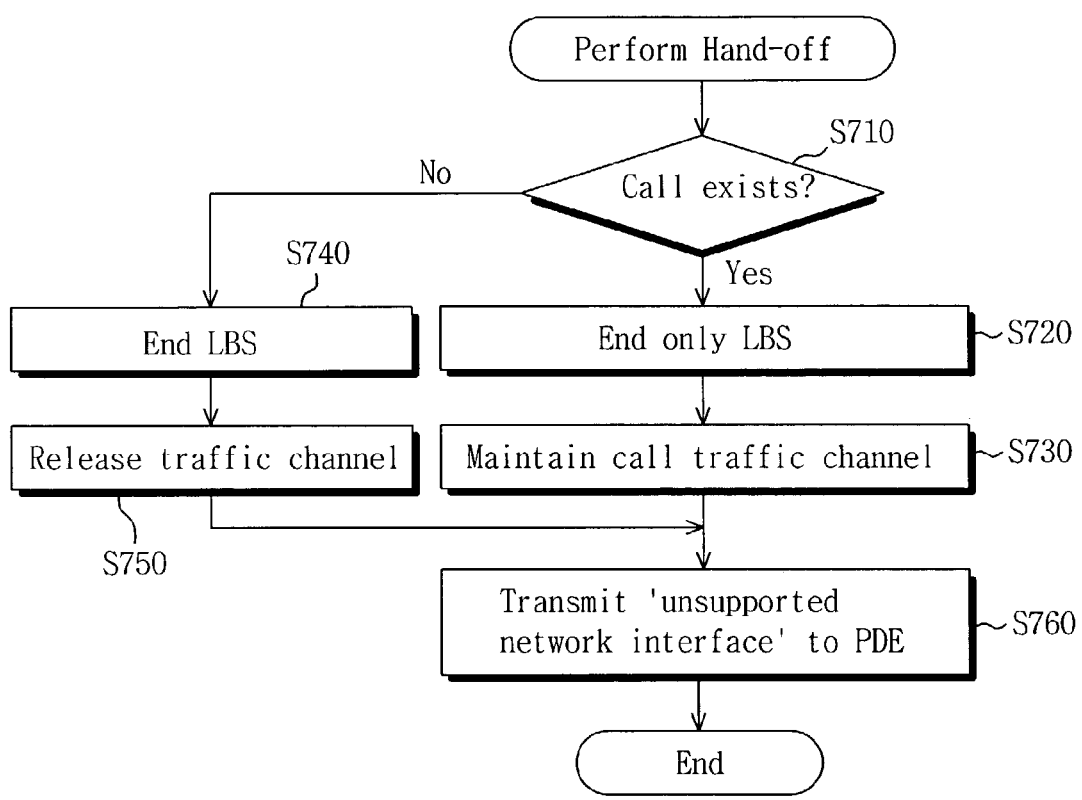
FIG. 5b is a flowchart showing a procedure of processing hand-off in the mobile switching center during the location based service.

FIG. 5b is a flowchart showing a procedure of processing hand-off in the MSC during the location based service.

When the MS performs a call and the location based service is provided, if handoff occurs, the MSC ends only the location based service (S720) and maintains the call traffic channel (S730). Then, the MSC transmits an SMDPP result message to the PDE (S760). For example, SMS_CauseCode of the result message has a value of 0×06 (unsupported network interface).

On the other hand, when the MS does not perform a call and the location based service is provided, if hand-off occurs, the MSC ends only the location based service (S740) and releases the traffic channel (S750). Thereafter, the MSC transmits an SMDPP result message to the PDE (S760). For example, SMS_CauseCode of the result message has a value of 0×06 (unsupported network interface).

After successfully ending the hand-off, when the MSC provides the location based service in a call state, the MSC transmits an SMDPP result message to the PDE. For example, SMS_CauseCode of the result message has a value of 0×06 (unsupported network interface).

Figure 5C:
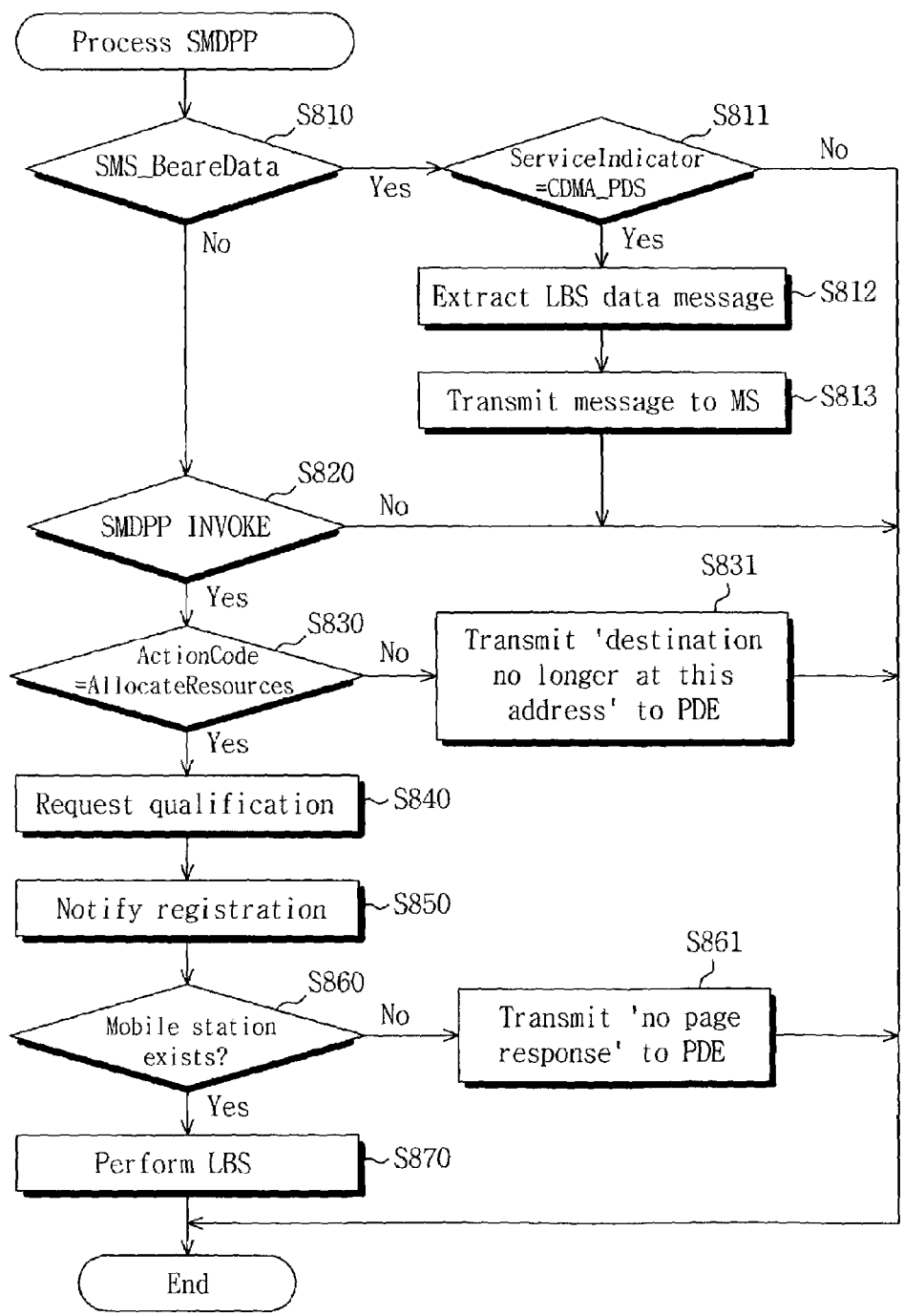
FIG. 5c is a flowchart showing a procedure of processing an SMDPP message from a positioning determination entity in the mobile switching center.

FIG. 5c is a flowchart showing a procedure of processing an SMDPP message from the PDE in the MSC.

When transmitting an SMDPP request message for the location based service, the PDE sets a length of an SMS tele-service identification parameter as '0'. The SMS tele-service identification parameter is not transmitted to the MS because a corresponding field does not exist in a CHARi field of a data burst message by wireless.

When a service indicator parameter of the SMDPP message is set as CDMA_PDS to process an SMS bearer data parameter (S810 and S811), the MSC extracts a location based service data message (S812). The extracted location based service data message is added to the CHARi field of the data burst message in a forward traffic channel by wireless, and transmitted to the MS (S813).

In a state where a subscriber does not exist in the MSC or VLR, when the MSC receives an SMDPP request message (S820), if an action code is 0×12 (resource allocation) (S830), the MSC newly performs location registration. That is, the MSC requests qualification (S840), notifies registration (S850), and performs the location based service. When the MS exists in the corresponding MSCNVLR, the MSC normally performs the location based service (S870), and when the MS does not exist in the MSCNVLR, the MSC sets SMS_CauseCode of the SMDPP result message as 0×20 (no page response), and transmits the message to the PDE (S861). The action code parameter represents an operation which will be performed by a designated functional element, and the SMS_CauseCode represents an SMS failure reason.

In a state where a subscriber does not exist in the MSC or VLR, when the MSC receives an SMDPP request message, if the action code is not 0×12 (resource allocation), the MSC transmits an SMDPP result message to the PDE (S831). Here, SMS_CauseCode of the result message is set as 'Destination no longer at this address'.

Figure 5D:
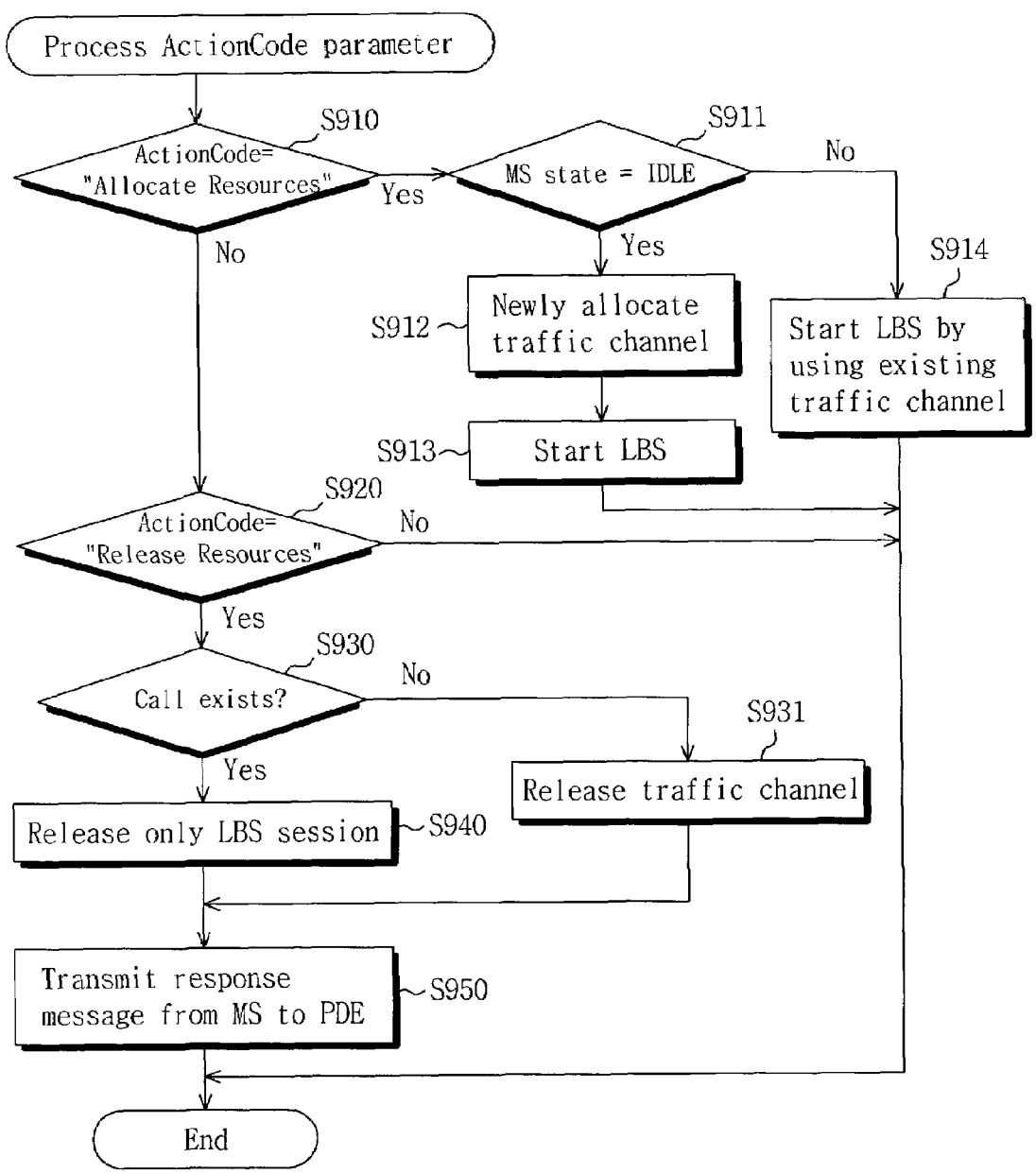
FIG. 5d is a flowchart showing a procedure of processing resource allocation and release in the mobile switching center.

FIG. 5d is a flowchart showing a procedure of processing resource allocation and release in the MSC.

The resource allocation in the MSC will now be explained (S910). When the MS is in an idle state (S911), if the MSC receives an SMDPP request message having an action code of 0×12 (resource allocation) from the PDE, the MSC allocates a new traffic channel (S912) and starts the location based service (S913). When failing to allocate the traffic channel, the MSC sets SMS_CauseCode of the SMDPP result message as 0×20 (no page response), and transmits the message. On the other hand, when the MS is in a conversation state, the MSC does not allocate a new traffic channel but uses the existing traffic channel to initiate the location based service (S914).

The resource release in the MSC will now be explained (S920). When the traffic channel is allocated to merely perform the location based service and a call does not exist, the MSC releases the traffic channel accessing the MS (S931), and transmits an SMDPP result message to the PDE (S950). Here, an SMS_BearerData parameter is set as a response message received in the MS. On the other hand, when a voice call exists in the MS (S930), the MSC maintains the traffic channel to perform the voice call and ends a location based service session (S940). Thereafter, the MSC transmits an SMDPP result message to the PDE (S950). Here, an SMS_BearerData parameter is set as a response message received in the MS. In the case that the location based service session is not active, the MSC sets SMS_CauseCode parameter as 0×6C (Session not active), and transmits the SMDPP result message to the PDE.

The abortion of the location based service session in the MSC will now be explained.

When the location based service is started in the MS in an idle state and the MS attempts call origination, if the MSC receives a release message from the MS, the MSC ends the location based service session and performs a general call originating procedure. Here, the MSC sets an SMS_CauseCode parameter as 0×6C (Session not active), and transmits an SMDPP result message to the PDE.

When the location based service is started in the MS in an idle state and the MS attempts call reception, the MSC ends the location based service session. The MSC sets an SMS_CauseCode parameter as 0×21 (Destination busy), and transmits the SMDPP message to the PDE.

When the MS starts the location based service in a busy state and ends a call, the MSC ends the location based service session. The MSC sets the SMS_CauseCode parameter as 0×6C (Session not active), and transmits the SMDPP message to the PDE.

On the other hand, when the MS is disconnected from the traffic channel during the location based service, the MSC ends the location based service session. When receiving the release message from the MS, the MSC sets the SMS_CauseCode parameter as 0×6C (Session not active), and transmits the SMDPP result message to the PDE. When the MSC does not receive an Ack message from the MS in a predetermined time (Timeout), the MSC sets the SMS_CauseCode parameter as 0×22 (No Acknowledgement), and transmits the SMDPP result message to the PDE.

When receiving a wireless data access request from the MS during the location based service, the MSC ends the location based service session and performs a wireless data access procedure. The MSC sets the SMS_CauseCode parameter as 0×6C, and transmits the SMDPP result message to the PDE.

In addition, when the MS is powered off during the location based service, the MSC ends the location based service session, and transmits the SMDPP result message to the PDE. Here, the transmitted SMS_CauseCode parameter is set as 0×6C (Session not active). On the other hand, when a battery of the MS is separated from a main body during the location based service, the MSC ends the LBS session, and transmits the SMDPP result message to the PDE. Here, when the MSC receives the release message from the MS, the MSC sets the SMS_CauseCode parameter as 0×6C (Session not active), and when the MSC does not receive the Ack message, the MSC sets the SMS_CauseCode parameter as 0×22 (No Acknowledgement).

Whenever the MSC receives the SMDPP request message from the PDE during the location based service session, the MSC initiates an inactivity timer. When the inactivity timer is ended, the MSC ends the location based service, and transmits the SMDPP result message to the PDE. Here, when the action code is resource allocation, the MSC sets the SMS_CauseCode parameter as 0×20 (No Page Response). When the MSC fails to allocate the traffic channel, the MSC sets the SMS_CauseCode parameter as 0×42 (Other Radio Interface Problem). In addition, when the MSC does not receive the Ack message from the MS, the MSC sets the SMS_CauseCode parameter as 0×22 (No Acknowledgement).

As discussed earlier, in accordance with the present invention, the cell based and GPS based location based services can be selectively provided according to the service function of the MS of the mobile communication subscriber or the location service function of the MSC. As a result, the location based service can be ended in all MS. Moreover, the GPS based location based service can be provided by the SMDPP message through the N07 signal network, and thus embodied during the voice call of the MS.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the metes and bounds of the claims, or equivalences of such metes and bounds are therefore intended to be embraced by the appended claims.

What is claimed is:

1. A mobile location based service system for providing cell based and GPS based location based services, comprising:

an application server for receiving a location based service request, requesting location information of a mobile station, and providing the location based service according to a received location information; and a location information providing system for providing location of the mobile station by selectively using one of a cell based positioning method and a GPS based positioning method based upon a service supported by the mobile station and a mobile switching center to which the mobile station belongs in response to the request from the application server, wherein the location information providing system comprises:

a mobile positioning center for transmitting a SMS request message to a home location register on the basis of an identification number of the mobile station according to the location information service request, discriminating a kind of location information service supported by the mobile station and the mobile switching center by analyzing a parameter of a SMS request result message received from the home location register, acquiring and transmitting the location information of the mobile station based on the kind of location information service in response to the request from the application server;

a positioning determination entity for determining location of the mobile station through the mobile switching center under the control of the mobile positioning center, and transmitting the location of the mobile station to the mobile positioning center when the GPS based service is supported by the mobile switching center and the mobile station; and a home location register for transmitting the location information of the mobile switching center, which the mobile station belongs to, to the mobile positioning center when the mobile station and the mobile switching center do not support a GPS function.

2. The system of claim 1, wherein the positioning determination entity determines the location by transmitting and receiving an SMDPP message with the mobile switching center through a N07 signal network.

3. The system of claim 1, wherein the positioning determination entity determines the location of the mobile station through the mobile switching center in which the mobile station roams.

* * * * *